United States Patent
Lynes et al.

(10) Patent No.: US 9,232,339 B2
(45) Date of Patent: Jan. 5, 2016

(54) MOBILE PUSH NOTIFICATION

(71) Applicant: ORACLE INTERNATIONAL CORPORATION, Redwood Shores, CA (US)

(72) Inventors: Matthew Lynes, Newport Beach, CA (US); Chris Huang, Cornwall, NY (US); Jayant Thomas, San Ramon, CA (US); Victor Matskiv, Walnut Creek, CA (US)

(73) Assignee: Oracle International Corporation, Redwood Shores, CA (US)

( * ) Notice: Subject to any disclaimer, the term of this patent is extended or adjusted under 35 U.S.C. 154(b) by 287 days.

(21) Appl. No.: 13/761,695

(22) Filed: Feb. 7, 2013

(65) Prior Publication Data

US 2014/0220933 A1 Aug. 7, 2014

(51) Int. Cl.
| | |
|---|---|
| H04M 1/725 | (2006.01) |
| H04W 4/00 | (2009.01) |
| H04L 29/08 | (2006.01) |
| H04L 12/58 | (2006.01) |
| H04W 4/18 | (2009.01) |
| H04L 12/18 | (2006.01) |
| G06F 17/30 | (2006.01) |

(52) U.S. Cl.
CPC ............ *H04W 4/00* (2013.01); *G06F 17/30867* (2013.01); *H04L 12/189* (2013.01); *H04L 12/1859* (2013.01); *H04L 51/00* (2013.01); *H04L 67/26* (2013.01); *H04W 4/18* (2013.01)

(58) Field of Classification Search
USPC ........ 455/412.2, 415, 432.3, 433, 435.1, 466, 455/410
See application file for complete search history.

(56) References Cited

U.S. PATENT DOCUMENTS

| | | | | |
|---|---|---|---|---|
| 8,924,489 | B2 * | 12/2014 | Bleau .................. | H04L 67/26 709/206 |
| 2012/0265976 | A1 * | 10/2012 | Spiers ................ | H04L 63/0218 713/2 |
| 2013/0084896 | A1 * | 4/2013 | Barkie et al. .................. | 455/466 |
| 2013/0144951 | A1 * | 6/2013 | Viswanath et al. ........... | 709/204 |
| 2013/0238895 | A1 * | 9/2013 | Dixon .................. | H04L 9/0825 713/156 |
| 2013/0318592 | A1 * | 11/2013 | Grier et al. ....................... | 726/9 |
| 2014/0148205 | A1 * | 5/2014 | Grinshpun ............. | H04L 69/16 455/466 |
| 2014/0162595 | A1 * | 6/2014 | Raleigh .................. | H04L 67/22 455/405 |
| 2015/0067062 | A1 * | 3/2015 | Bleau et al. .................. | 709/204 |
| 2015/0095983 | A1 * | 4/2015 | Jang .................... | H04L 63/0884 726/3 |

* cited by examiner

*Primary Examiner* — Dai A Phuong
(74) *Attorney, Agent, or Firm* — Kraguljac Law Group, LLC

(57) ABSTRACT

Systems and methods are described herein that provide a mobile push notification system that sends notifications to various types of mobile devices using a single cloud based interface. One example embodiment includes a registration logic configured to receive device data from a mobile device. A record of the device data is stored in a database. A token generator creates a registration token that identifies the mobile device. The registration logic is facilitates communication between the mobile device and a vendor service when the registration token is received from the mobile device.

13 Claims, 5 Drawing Sheets

MOBILE PUSH NOTIFICATION

BACKGROUND

Mobile devices such as handheld computing devices use an operating system (OS) to run various types of application software, commonly referred to as applications or apps. Applications are available through application distribution platforms, which are typically operated by the vendor of the OS such as APPLE, ANDROID, GOOGLE, WINDOWS. The user of the mobile device may subscribe to various types of information to be received by the applications as notifications. Applications receive notifications generated by a publisher associated with the application. The notifications can be received by periodically polling the publisher. Push notifications are initiated by the publisher and are sent immediately through an open connection.

The push notifications sent by the publisher are designed specifically for the OS of the mobile device. Thus, each application uses a separate notification interface for each mobile OS. Each application also has to register multiple security certificates with the different OS vendors. Therefore, if a publisher has ten applications, the publisher develops ten different interfaces and registers ten security certificates with each mobile OS vendor. This requires substantial infrastructure to generate multiple notifications and security certificates for each OS vendor as well as time, effort, and maintenance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
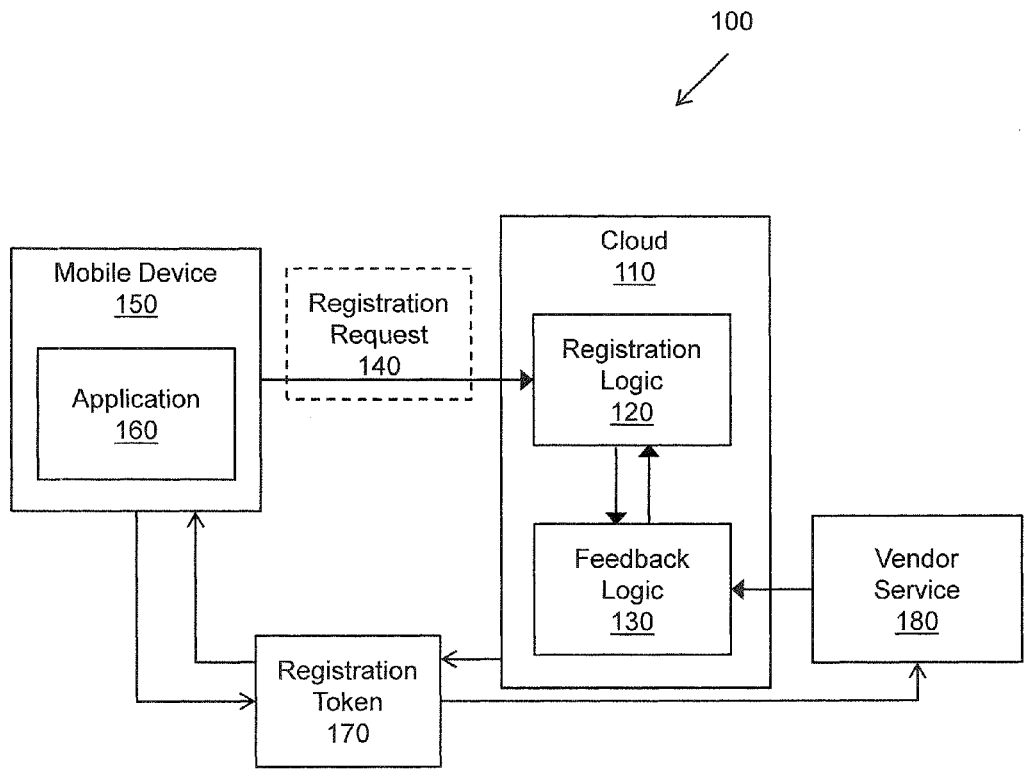
FIG. 1 illustrates one embodiment of a system associated with mobile push notification.

Systems and methods are described herein that provide a mobile push notification system that sends notifications to various types of mobile devices using a single cloud based interface. The push notification system isolates and identifies different OS vendors and their mobile applications so that the mobile device does not have to store information about each different OS and then create an interface depending on the OS being used. Instead, the cloud based interface stores information about each OS and the mobile device can access as little of the information as the mobile device needs to interface with a vendor service. Therefore, custom interfaces for each application on each different OS are not necessary. Instead, a simplified and unified notification interface for the mobile applications is provided.

A client that wishes to receive notifications from an application on a mobile device selects a setting that allows the application to use an open connection with the publisher to receive immediate notifications. To provide notifications, an application needs data about the mobile device including two pieces of information: what operating system is used by the mobile device and a security certificate for the operating system that verifies the identity of the mobile device. To simplify the processing of notification requests, mobile devices are registered in a central data store (e.g. cloud, database, memory) and identified by a registration token. A mobile device uses the registration token to determine what information stored in the cloud that the mobile will device need to enable push notifications. For example, the registration token is used to identify the appropriate security certificate. Security certificates for various OS vendors are centrally maintained and are used to initiate push notifications for applications on the mobile device.

For example, the client may use a sports related application to receive football scores updates in real-time. The mobile device sends a request to be registered for a push notification service. The push notification service receives and stores device data (e.g., the type of OS for the device) for the mobile device and performs a database lookup to determine if the mobile device has been previously registered. If the mobile device has not been registered, a registration token is created for the mobile device and stored in the database along with the device data. The registration token is sent to the mobile device for use in subscribing to notifications.

Once the mobile device has been registered, the registration token is used by the mobile device to subscribe to push notifications. For example, the registration logic receives the registration token from a mobile device and invokes an OS vendor service to send the push notifications for the football score application. Security certificates are centrally maintained for various vendor services (e.g., APPLE, ANDROID, GOOGLE, WINDOWS). The security certificate is an electronic document that uses a digital signature to bind a public key with an entity, such as a mobile device. The security certificate can be used to verify that a public key belongs to the identified mobile device. If the mobile device seeking push notification of football scores uses the ANDROID operating system, this information is recorded in the database and the security certificate associated with ANDROID is provided to the football score application when initiating push notifications for the mobile device. Conventionally, the application running on the mobile device had to store a security certificate for every vendor.

Accordingly, the cloud acts as a bridge between the mobile device and the vendor. In this manner, the football score application running on the mobile device does not have to maintain large infrastructure of data, such as security certificates, to receive push notifications. The infrastructure of data is stored with the push notification service in the cloud and mapped to the mobile device for use in receiving push notifications.

With reference to FIG. 1, one embodiment of a system 100 associated with mobile push notification is illustrated. The system 100 operates in a web based cloud 110 used for accessing registration and notification information. Web-based protocol handlers allow web-based logics, specifically a registration logic 120 and a feedback logic 130, to operate online allowing device data to be harvested from any number of devices and stored in a central data store. The device data can be integrated and processed to allow the identified users to receive push notifications.

The registration logic 120 receives a registration request 140. The registration request 140 is sent by a mobile device 150. The registration request 140 includes device data to identify an individual user and the mobile device 150. For example, the registration request 140 specifies a vendor service name, such as APPLE PUSH NOTIFICATION SERVICE, a target descriptor that specifies the operating system of the mobile device 150, and the name of the application 160 as registered with a vendor service 180.

The registration logic 120 may receive a registration request 140 in response to a triggering event (e.g., the mobile device 150 being set to receive push notifications) or the registration request 140 may be sent periodically (e.g., according to a schedule) by the mobile device 150. Alternatively, the registration request 140 may be automatically sent when an application 160 that uses push notifications is downloaded to the mobile device 150. The mobile device 150 accesses the cloud 110 via a web-based protocol. In one embodiment, the collection of device data is performed, via the web, without impacting the normal operation of the mobile device 150.

Upon receiving the registration request 140, the registration logic 120 determines whether the mobile device 150 has been previously registered. The registration logic 120 compares the device data of the mobile device 150 to device data corresponding to registered mobile devices to determine whether the mobile device was previously registered. In addition to determining if the mobile device 150 has been previously registered, it is determined whether the mobile device 150 has been deemed inactive.

The feedback logic 130 determines whether the mobile device 150 has been deemed inactive by accessing a list of devices that are deemed inactive and not to receive push notifications. A device is inactive if the user has elected to no longer receive push notifications. A device could also be deemed inactive if the vendor service 180 provides a de-activation date. The feedback logic 130 uses the device data in the registration request 140 to determine if the mobile device 150 has been deemed inactive.

If the registration logic 120 determines that the mobile device 150 has not been previously registered and the feedback logic 130 determines that the mobile device 150 is active, the registration logic 120 creates a registration token 170 for the mobile device 150. The registration token 170 is a unique token that identifies the mobile device 150 and a specific user. The cloud 110 uses the registration token 170 to identify the mobile device 150 and the information necessary for the mobile device 150 to receive push notifications.

The registration logic 120 creates a response that includes the registration token 170. The response may also include additional information (e.g., security certificate) needed to communicate with the vendor service 180. Initially, the cloud 110 uses device data in the registration request 140 to determine what additional information to send in the created response. In later transactions, the registration logic 120 validates the registration token 170 and uses the registration token 170 to identify the additional information needed. Using the information in the registration token 170, the registration logic 120 invokes the vendor service 180 for the mobile device 150 to send push notifications for the application 160.

Figure 2:
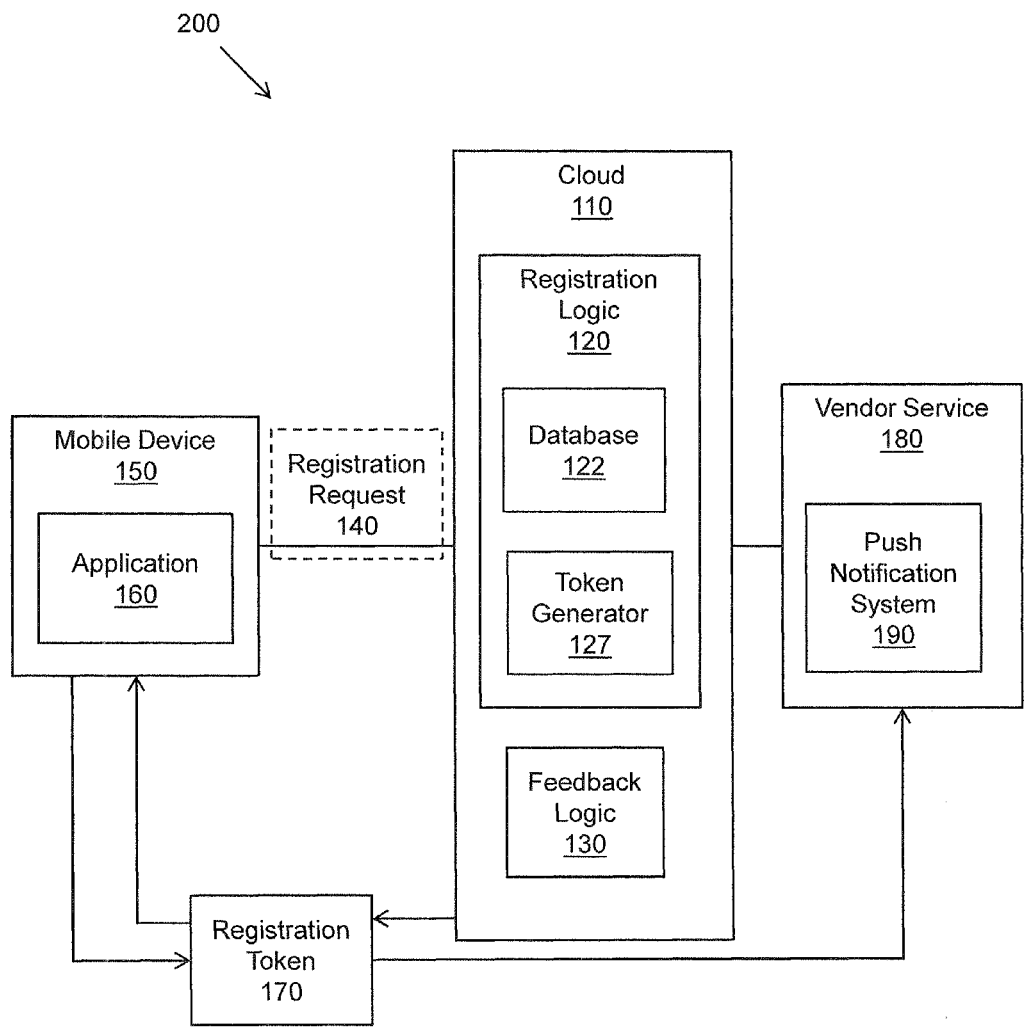
FIG. 2 illustrates another embodiment of a system associated with mobile push notification.

With reference to FIG. 2, one embodiment of a system 200 associated with mobile push notification is illustrated. The system 200 includes several of the same components illustrated in FIG. 1. These components function as described in FIG. 1. For example, the registration logic 120 receives a registration request 140 from a mobile device 150. The registration logic 120 determines if the mobile device 150 was previously registered by looking for the device data in a database 122. Based on the results of the database lookup, it is determined whether there are existing records for the device data of the mobile device 150 stored in the database 122. If there is no record for the mobile device 150 in the database 122, the mobile device has not been previously registered and the token generator 127 creates a registration token 170.

The token generator 127 generates the registration token 170 using a registration token generation algorithm. In one example, the registration token 170 is a hex-encoded 24 byte sequence. The hex-encoded 24 byte sequence contains XOR-encrypted bit shuffled unique internal identifier and a message Authentication Code (MAC) signature. For security purposes, the token generator 127 creates registration tokens with a length and complexity that makes it impractical to compose a valid registration token without knowing the registration token generation algorithm. Furthermore, the registration token 170 is unknown to the user of the mobile device 150.

Once the registration token 170 is sent to the mobile device 150, a database record is generated and stored in the database 122. The database record includes the registration token 170. Alternatively, the record includes a registration identification number that is resolved from the registration token 170. Using a registration identification number provides an additional security layer. The record also includes a message and a timestamp. The database 122 is maintained in the cloud and is accessible by the registration logic 120. The records are accessed by the feedback logic to validate the registration token 170, when the mobile device 150 enables push notifications. The records in the database 122 may also be accessed by the vendor service 180 through a push notification system 190 for the application 160. The vendor service 180 requires security certificates issued by the vendor to secure the connection. The record for a mobile device indicates which security certificate is appropriate for the mobile device. In this manner, the appropriate security certificate can be identified from information in the record and retrieved from the database 122, so that the mobile device does not have to maintain all possible security certificates.

Therefore, the information required to enable push notifications, such as security certificates are maintained in the cloud 110 and used by the registration logic 120 and feedback logic 130 to create a centralized infrastructure. Accordingly, mobile devices like 150 do not have to maintain all possible information such as multiple security certificates. Instead, the mobile device 150 is able to access only the information that the mobile device 150 needs to enable mobile push notifications.

Figure 3:
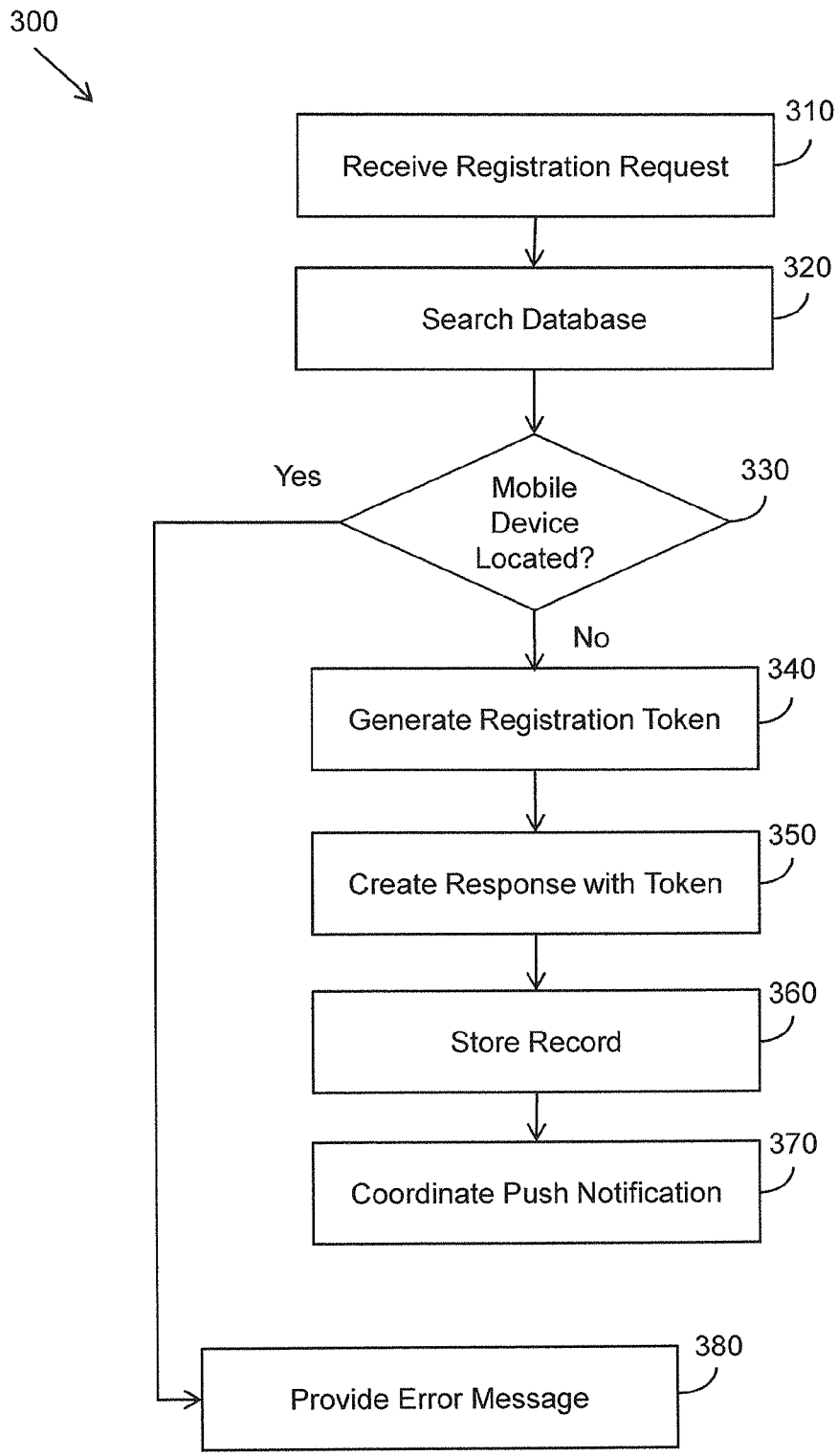
FIG. 3 illustrates another embodiment of a method associated with mobile push notification.

FIG. 3 illustrates one embodiment of a method 300 associated with mobile push notification. The method 300 is performed in a web based cloud used for accessing registration and notification information. At 310, a registration request is received. The registration request includes device data to identify a mobile device. The device data may also include the identity of a user, the name of the vendor service, and a target descriptor that specifies the device's operating system. Upon receiving the registration request, a database is searched for a registration record for the mobile device. At 330, it is determined whether there are existing records for the mobile device, meaning that the mobile device has been previously registered.

If the mobile device has not been previously registered, the method 300 proceeds to 340. At 340, a registration token is generated. The registration token is a unique token that identifies a particular mobile device. At 350, a registration response including the registration token is sent to the mobile device. Once the registration token is sent to the mobile device, a database record is created at 360. The database record includes information about the mobile device (e.g., identifying information, a target descriptor that specifies the operating system of the mobile device 150, the name of the application 160). Using the registration token, push notifications between the mobile device and the vendor service are coordinated at 370. For example, communication between the mobile device and the vendor service are facilitated by accessing a security certificate based, at least in part, on the device data in the stored record for the mobile device.

If the database lookup determines at 330 that the mobile device has been previously registered, the method 300 proceeds to 380 to send an error message. The error message includes a code indicating an error while processing the registration request. The code may be a word, an alphanumeric code, or a numeric code. The error message further includes a sequence uniquely describing registration of the mobile device based at least in part on the vendor service and application. The error message also describes the error that caused registration of the mobile device to fail. The mobile device will be unable to receive push notifications because the mobile device has an invalid registration token. For example, a mobile device having an registration token that has expired is invalid and therefore, the mobile device will not receive push notifications.

Figure 4:
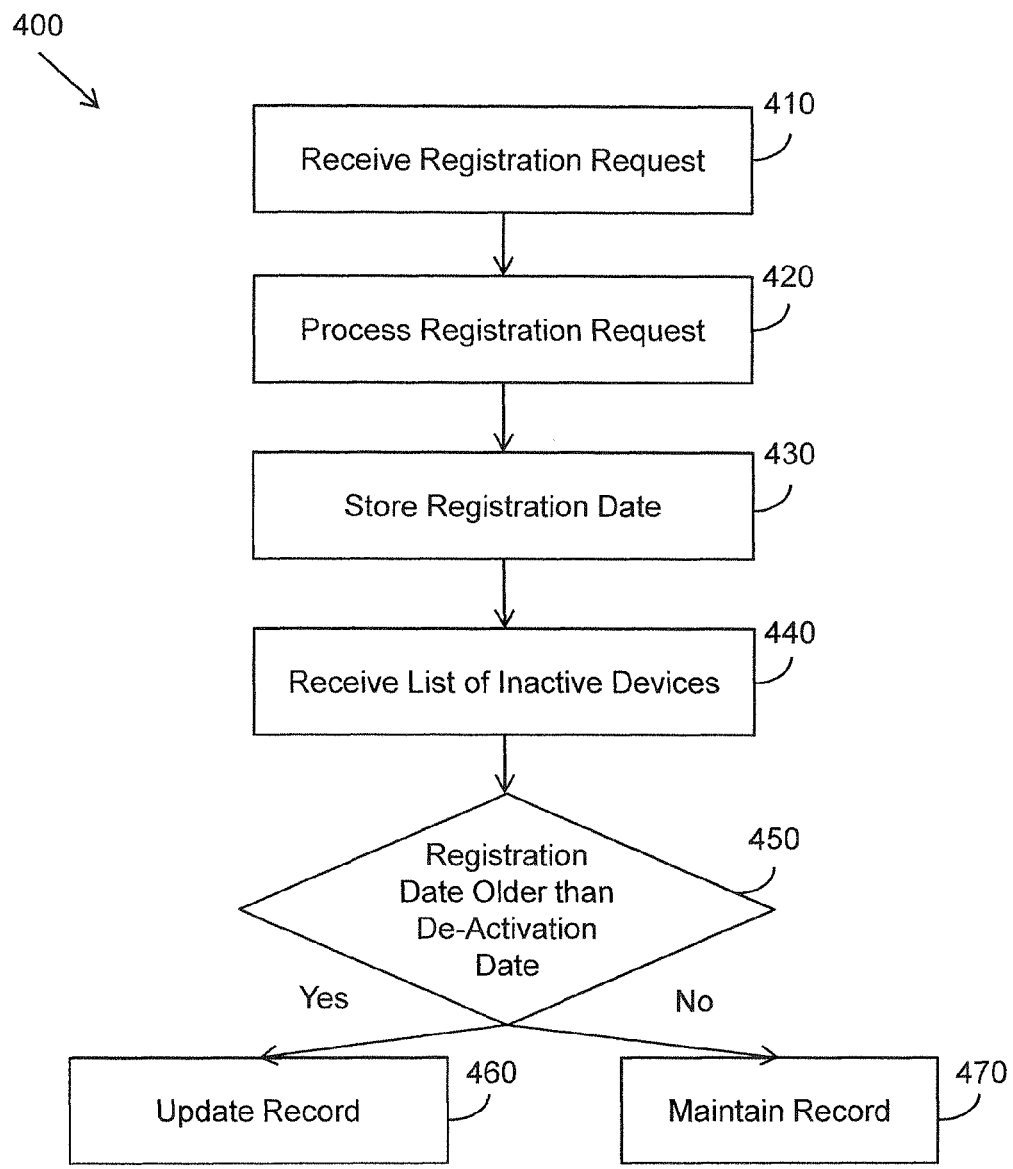
FIG. 4 illustrates another embodiment of a method associated with mobile push notification.

With reference to FIG. 4, one embodiment of a method 400 associated with mobile push notification is illustrated. The method 400 includes similar steps as illustrated in FIG. 3, and functions in a similar manner. At 410, a registration request is received. The registration request includes device data that may include a registration date. The registration date is used to confirm a date on which registration is to be deactivated. At 420, the registration request is processed. If the registration request did not include a registration date, a registration date may be generated. The registration date is stored at 430. The registration date may be stored in a database with information identifying the corresponding mobile device.

At 440, a list of deactivation dates corresponding to registered mobile devices is received. The list of deactivation dates is received from a vendor feedback service through the cloud. The connection may be made in response to a triggering event (e.g., being prompted by the vendor feedback service), continually, or periodically (e.g., according to a schedule). The deactivation dates indicate the date on which registered mobile devices should stop receiving push notifications. At 450, the list of de-activation dates is compared to the stored registration date for each mobile device.

If the registration date for a mobile device is older than the de-activation date provided by the vendor service, the end-date of the registration record for the mobile device is updated at 460. Consequently, the corresponding mobile device will be unable to receive push notifications. In one embodiment, the registration token of a mobile device having a registration date older than the deactivation date is invalidated to stop the mobile device from receiving push notifications. If the registration date is not older than the de-activation date provided by the vendor service, the registration record is maintained at 470. Thus, the system can determine when to cease sending push notifications.

Figure 5:
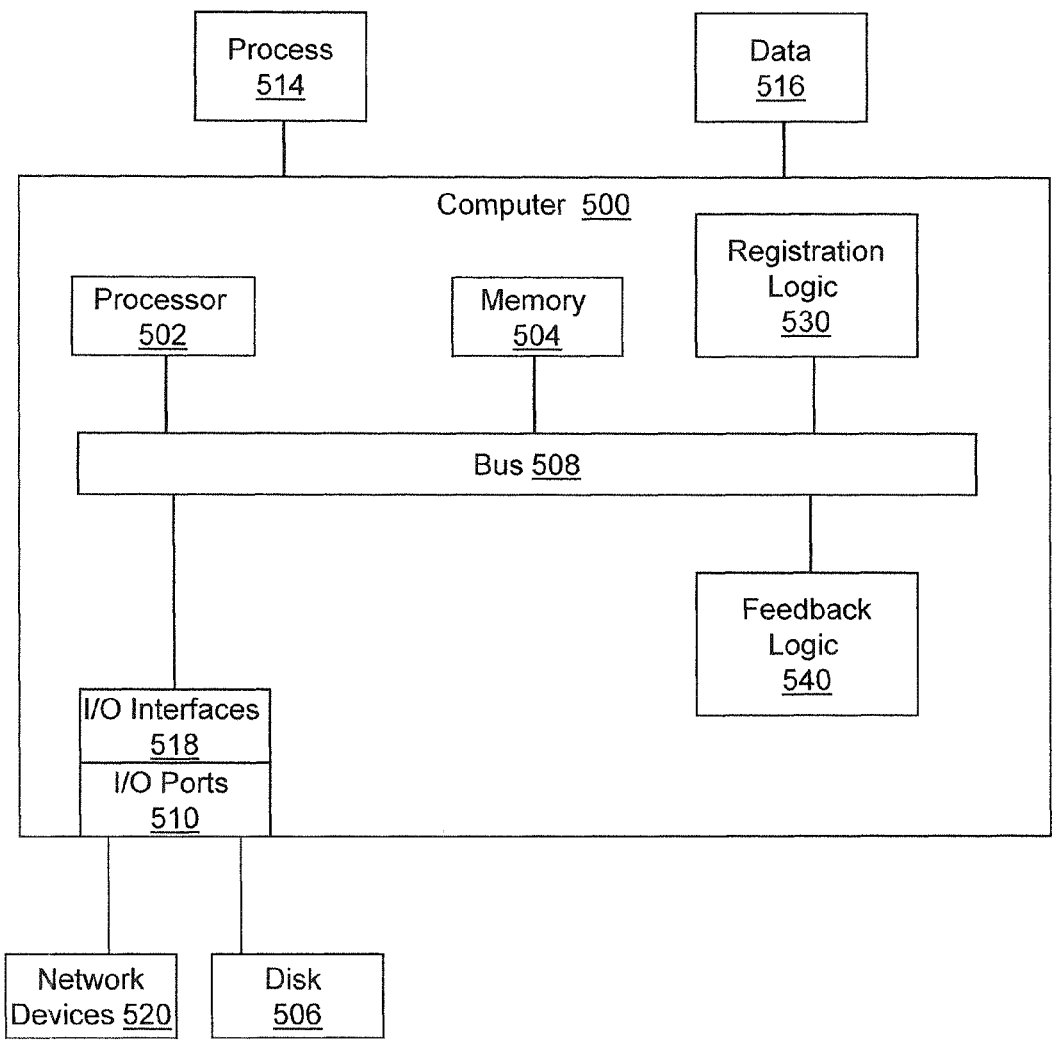
FIG. 5 illustrates an embodiment of a computing system in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a registration logic 530 and a feedback logic 540 that are configured to operate online allowing device data to be harvested from any number of devices and identify specific users. In different examples, the registration logic 530 and the feedback logic 540 may be implemented in hardware, a non-transitory computer-readable medium with stored instructions, firmware, and/or combinations thereof. While the registration logic 530 and the feedback logic 540 are illustrated as a hardware component attached to the bus 508, it is to be appreciated that in one example, the registration logic 530 and the feedback logic 540 could be implemented in the processor 502.

In one embodiment, the registration logic 530 and the feedback logic 540 are means (e.g., hardware, non-transitory computer-readable medium, firmware) for performing registration and determining if mobile devices have been deemed inactive. The means may be implemented, for example, as an ASIC programmed to perform registration and deactivation monitoring. The means may also be implemented as stored computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods of FIGS. 3 and 4.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
USB: universal serial bus.
XML: extensible markup language.
WAN: wide area network.

"Computer component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform functions, the instructions comprising:
   instructions for receiving, from a mobile device, a registration request that includes device data and a registration token that uniquely identifies the mobile device;
   instructions for accessing a database that stores a registration record for the mobile device that includes the registration token and identifies an operating system of the mobile device;
   instructions for accessing a central memory that stores security certificates for a plurality of operating systems and identifying a security certificate mapped to the operation system of the mobile device; and
   instructions for, in response to the request, providing the security certificate to the mobile device for use in subscribing to push notifications;
   such that security certificates for operating systems not utilized by the mobile device are not stored on the mobile device.

2. The non-transitory computer-readable medium of claim 1, where the device data includes a vendor service name, a target descriptor that specifies an operating system of the mobile device, and the name of an application registered with a vendor service.

3. The non-transitory computer-readable medium of claim 1, where the registration record includes a registration identification number resolved from the registration token.

4. The non-transitory computer-readable medium of claim 1, where the instructions further comprise:
   instructions for identifying a registration date for the mobile device based, based at least in part, on the device data;
   instructions for determining whether the registration date is older than a deactivation date, where the deactivation date is a point in time that the mobile device is barred from receiving a push notifications; and
   instructions for, in response to determining that the mobile device has not been previously registered, creating a registration token that identifies the mobile device.

5. A computing system, comprising:
   a registration logic configured to receive a registration request that includes a registration token that uniquely describes a mobile device;
   a database configured to store a registration record that includes device data that identifies an operating system of the mobile device mapped to the registration token;
   memory configured to store security certificates for a plurality of operating systems;
   where the registration logic is configured to, in response to the registration request, provide the security certificate for the mobile device's operating system to the mobile device for use in subscribing to push notifications, such that security certificates for operating systems not utilized by the mobile device are not stored on the mobile device.

6. The computing system of claim 5, where the device data includes a vendor service name, a target descriptor that specifies an operating system of the mobile device, and a name of an application registered with a vendor service.

7. The computing system of claim 5, further comprising:
   a feedback logic configured to determine whether the mobile device is inactive by accessing a list of devices that are not to receive push notifications.

8. The computing system of claim 7, where the feedback logic is configured to use the device data in the registration record to determine whether the mobile device is inactive.

9. The computing system of claim 8, where the device data includes a registration date and where the feedback logic is configured to, in response to the registration date being older than a de-activation date, recording that the mobile device inactive.

10. A computer-implemented method, comprising:
    instructions for receiving, from a mobile device, a registration request that includes device data and a registration token that uniquely identifies the mobile device;
    instructions for accessing a database that stores a registration record for the mobile device that includes the registration token and identifies an operating system of the mobile device;
    instructions for accessing a central memory that stores security certificates for a plurality of operating systems and identifying a security certificate mapped to the operation system of the mobile; and
    instructions for, in response to the request, providing the security certificate to the mobile device for use in subscribing to push notifications;
    such that security certificates for operating systems not utilized by the mobile device are not stored on the mobile device.

11. The computer-implemented method of claim 10, where the device data includes a vendor service name, a target descriptor that specifies an operating system of the mobile device, and the name of an application registered with a vendor service.

12. The computer-implemented method of claim 10, where the registration record includes a registration identification number resolved from the registration token.

13. The computer-implemented method of claim 10, further comprising:
    identifying a registration date for the mobile device based, based at least in part, on the device data;
    instructions for determining whether the registration date is older than a deactivation date, where the deactivation date is a point in time that the mobile device is barred from receiving a push notifications; and
    instructions for, in response to determining that the mobile device has not been previously registered, creating a registration token that identifies the mobile device.

* * * * *